US009882702B2

(12) United States Patent
Devuyst et al.

(10) Patent No.: US 9,882,702 B2
(45) Date of Patent: Jan. 30, 2018

(54) ASYMMETRIC FULL DUPLEX COMMUNICATION INCLUDING DEVICE POWER COMMUNICATION

(71) Applicant: EQCOLOGIC N.V., Brussels (BE)

(72) Inventors: Bram Devuyst, Buizingen (BE); Maarten Kuijk, Antwerpen (BE)

(73) Assignee: EQCOLOGIC N.V., Brussels (BE)

( * ) Notice: Subject to any disclaimer, the term of this patent is extended or adjusted under 35 U.S.C. 154(b) by 727 days.

(21) Appl. No.: 13/946,505

(22) Filed: Jul. 19, 2013

(65) Prior Publication Data

US 2013/0301483 A1 Nov. 14, 2013

Related U.S. Application Data

(62) Division of application No. 12/770,208, filed on Apr. 29, 2010, now Pat. No. 8,897,178.

(30) Foreign Application Priority Data

Apr. 30, 2009 (EP) .................................... 09159216

(51) Int. Cl.
*H04L 5/14* (2006.01)
*H04L 25/02* (2006.01)
(Continued)

(52) U.S. Cl.
CPC ........... *H04L 5/1407* (2013.01); *H04B 3/548* (2013.01); *H04L 5/1461* (2013.01);
(Continued)

(58) Field of Classification Search
CPC ... H04B 3/50; H04B 3/52; H04B 3/54; H04B 3/548; H04B 3/56; H04L 25/026;
(Continued)

(56) References Cited

U.S. PATENT DOCUMENTS 5,751,820 A   5/1998   Taenzer
5,771,026 A   6/1998   Stengel, Jr.
(Continued)

FOREIGN PATENT DOCUMENTS

EP   0014969 A1   9/1980

OTHER PUBLICATIONS

Search Report from corresponding EP Application No. 13174528.3, dated Aug. 2, 2013.
(Continued)

*Primary Examiner* — Young T Tse
(74) *Attorney, Agent, or Firm* — Justin Cassell; Workman Nydegger (57) ABSTRACT

An active transceiver circuit for transmission of a low bitrate data signal over and reception of a high bitrate data signal from a single ended transmission medium is provided. The active transceiver circuit includes an input port for receiving a low bitrate input data signal, an output port for delivering a high bitrate output data signal, a differential input/output port for launching a low bitrate data signal into the single ended transmission medium and for receiving a high bitrate data signal from the single ended transmission medium, a first and second single ended output driver adapted for each delivering, on their respective output nodes, the shaped low bitrate input data signal, and a high bitrate receiver for receiving the signals at output nodes of the first and second single ended output drivers, and for generating a high bitrate output data signal on the output port.

19 Claims, 7 Drawing Sheets

(51) Int. Cl.
*H04B 3/54* (2006.01)
*H04L 12/801* (2013.01)
*H04L 12/835* (2013.01)
*H04L 12/815* (2013.01)
*H04L 12/54* (2013.01)
*H04L 25/03* (2006.01)

(52) U.S. Cl.
CPC ........ *H04L 25/028* (2013.01); *H04L 25/0292* (2013.01); *H04L 25/0298* (2013.01); *H04L 5/14* (2013.01); *H04L 5/1423* (2013.01); *H04L 12/5602* (2013.01); *H04L 25/0272* (2013.01); *H04L 25/03878* (2013.01); *H04L 47/10* (2013.01); *H04L 47/22* (2013.01); *H04L 47/30* (2013.01); *H04L 47/35* (2013.01)

(58) Field of Classification Search
CPC ............. H04L 25/0266; H04L 25/0272; H04L 25/0276; H04L 25/0278; H04L 25/028; H04L 25/0292; H04L 25/0298; H04L 5/1407; H04L 5/1415; H04L 5/1461; H04L 5/14; H04L 5/1423; H04L 12/5602; H04L 47/10; H04L 47/22; H04L 47/30; H04L 47/35
USPC ........ 375/219, 220, 222, 257, 258; 370/282, 370/293; 333/112, 118, 123, 124, 28 R, 333/24 C
See application file for complete search history.

(56) References Cited

U.S. PATENT DOCUMENTS

| | | |
|---|---|---|
| 5,796,024 A | 8/1998 | Stanwood |
| 5,796,624 A | 8/1998 | Sridhar et al. |
| 6,426,970 B1 | 7/2002 | Thornton et al. |
| 7,113,561 B2 | 9/2006 | Schenk |
| 7,155,127 B2 | 12/2006 | Akimoto et al. |
| 7,199,604 B2 | 4/2007 | Hecht et al. |
| 7,265,587 B1 | 9/2007 | Ng et al. |
| 7,330,703 B2 | 2/2008 | Verbist |
| 2004/0120405 A1 | 6/2004 | Jaussi et al. |
| 2007/0009267 A1* | 1/2007 | Crews .................. H04B 10/504 398/182 |
| 2007/0200218 A1* | 8/2007 | Mukaibara ........... H05K 1/0233 257/691 |
| 2008/0129349 A1 | 6/2008 | Yanbo et al. |
| 2009/0054018 A1 | 2/2009 | Waheed et al. |
| 2010/0118188 A1* | 5/2010 | Nakajima .............. H04N 5/775 348/467 |

OTHER PUBLICATIONS

EPO Search Report from EP Patent Application No. 09159216.2, dated Oct. 29, 2009.
EPO Search Report from EP Patent Application No. 12174398.3, dated Aug. 17, 2012.
Office Action cited in corresponding U.S. Appl. No. 12/770,208, dated Jun. 20, 2012.
Final Office Action cited in corresponding U.S. Appl. No. 12/770,208, dated Apr. 11, 2013.

* cited by examiner

ASYMMETRIC FULL DUPLEX COMMUNICATION INCLUDING DEVICE POWER COMMUNICATION

FIELD OF THE INVENTION

The present invention relates to transceivers for full-duplex bidirectional communication with high bitrate communication (270 Mbps or more) in one direction, low bitrate communication (at least 3 times lower than the high bitrate) in the opposite direction and device power communication in both directions over a single ended transmission medium utilizing a common path for both transmission and reception.

BACKGROUND OF THE INVENTION

U.S. Pat. No. 7,330,703B2 shows splitter circuits for having bidirectional communication using frequency division multiplexed transmission based on passive filtering using magnitudes of impedances without explaining how to achieve device power communication over the transmission medium and without teaching how to achieve this in a way that the transmission line is terminated at both ends, which is of crucial importance for avoidance of transmission line reflections.

U.S. Pat. No. 6,426,970B1 shows an active bidirectional splitter for communication over a common coaxial cable and also many other prior art circuits using transformers and chokes. It does not show how to get enough splitter separation or how to integrate a cable equalizer or how to work without these magnetic elements that have limited high frequency performance. Neither does it show how an active splitter can be made that allows to have high bitrate data reception combined with low bitrate data transmission, and having at the same time device power communicated to or from the splitter. Neither does it show how an active splitter can be made that allows to have low bitrate data reception combined with high bitrate data transmission, and having at the same time device power communicated to or from the splitter.

SUMMARY OF THE INVENTION

It is an object of the present invention to provide transceivers for full-duplex bidirectional communication with high bitrate communication (270 Mbps or more) in one direction and low bitrate communication (at least 3 times lower than the high bitrate) in the opposite direction over a single ended transmission medium utilizing a common path for both transmission and reception. It is an advantage of embodiments of the present invention that device power can be communicated in both directions over the single ended transmission medium.

This objective is reached by devices according to embodiments of the present invention.

In a first aspect, the present invention provides an active transceiver circuit for full duplex transmission of a low bitrate data signal over and reception of a high bitrate data signal from a single ended transmission medium. The transmission medium comprises an inner conductor and a conductive shield layer, and utilizes a common path for both transmission and reception. The low bitrate data signal has a bitrate at least 3 times lower than the high bitrate data signal. The active transceiver circuit according to embodiments of the present invention comprises:

an input port for receiving a low bitrate input data signal,
an output port for delivering a high bitrate output data signal,
a differential input/output port for launching a low bitrate data signal into the single ended transmission medium and for receiving a high bitrate data signal from the single ended transmission medium,
a first and second single ended output driver adapted for each shaping the low bitrate input data signal to a maximum slew rate that is at least 5 times smaller than the maximum slew rate of the high bitrate data signal (which maximum slew rate is application dependent), and for delivering, on their respective output nodes, the shaped low bitrate input data signal,
a high bitrate receiver for receiving the signals at output nodes of the first and second single ended output drivers, and for generating a high bitrate output data signal on the output port.

According to embodiments of the present invention, the first and second single ended output drivers may be terminated by means of termination impedances, e.g. termination resistors.

According to embodiments of the present invention, the first and second output drivers may be current mode logic output driver stages. The first and second output drivers may be adapted for each delivering the low bitrate input data signal shaped to a maximum slew rate by provision of a pre-driver for limiting the signal's slew rate on an input node, i.e. a node prior to the first and second output driver stages.

In alternative embodiments, the first and second output drivers may each comprise a set of drivers that are switched consecutively for limiting the maximum slew rate on their respective output nodes.

An active transceiver circuit according to embodiments of the present invention may further comprise an amplitude limiter for limiting the delivered amplitude by first and second single ended output drivers so as to further reduce the maximum slew rate on their respective output nodes.

In an active transceiver circuit according to embodiments of the present invention, the high bitrate receiver may comprise an equalizer for compensating for frequency dependent losses in the single ended transmission medium.

In a second aspect, the present invention provides an active transceiver circuit according to embodiments of the first aspect of the present invention incorporated in an active bidirectional transceiver.

Hence, in this second aspect, the present invention provides an active bidirectional transceiver comprising an active transceiver circuit according to embodiments of the first aspect of the present invention, wherein the transceiver further comprises a first transmission line coupled to the differential input/output port and arranged for being coupled to the inner conductor of the single ended transmission medium, and a second transmission line coupled to the differential input/output port and arranged for being coupled to the conductive shield layer of the single ended transmission medium. The second transmission line may be end terminated.

In an active bidirectional transceiver according to embodiments of the present invention the first transmission line may be AC coupled. A first impedance may be coupled to the first transmission line for device power communication.

The second transmission line may also be AC coupled. A second impedance may be coupled to the second transmission line for improved balance. The second impedance may be substantially the same as the first impedance in impedance value and in composition.

The first impedance may include at least an inductor. The first impedance may include at least two components in series. The first component connected to the first transmission line may be adapted for allowing the high bitrate data signal to pass in a way such that the receiver is able to recover the high bitrate output data signal substantially without errors. The second component may be adapted for allowing the edges of the low bitrate data signal to pass with an edge amplitude reduction of maximally 30%.

The first impedance may comprise at least a Ferrite Bead.

It is an advantage of an active bidirectional transceiver according to embodiments of the present invention that a high frequency loss of at least −26 dB can be recovered with a bit error rate of less than 10-12.

In a third aspect the present invention provides an active transceiver circuit for full duplex transmission of a high bitrate data signal over and reception of a low bitrate data signal from a single ended transmission medium utilizing a common path for both transmission and reception. The low bitrate data signal has a bitrate at least 3 times lower than the high bitrate data signal. The single ended transmission medium comprises an inner conductor and a conductive shield layer. The transceiver circuit comprises:

an input port for receiving a high bitrate input data signal, an output port for delivering a low bitrate output data signal, a differential input/output port for launching a high bitrate data signal into the single ended transmission medium and for receiving a low bitrate data signal from the single ended transmission medium, a differential output driver for receiving the differential high bitrate input data signal and transmitting this signal to the differential input/output port, an averaging circuit adapted for performing at least averaging of the signals at output nodes of the differential output driver, and low pass filtering of the averaged signal, and a signal restore circuit adapted for receiving the low pass filtered average signal from the averaging circuit and for generating therefrom a restored low bitrate output data signal on the output port.

In an active transceiver circuit according to embodiments of the present invention, the differential driver may include one or more termination resistors.

The signal restore circuit of an active transceiver circuit according to embodiments of the present invention may comprise a first amplifier and a second amplifier, the second amplifier having positive feedback and being capacitively connected to the output of the first amplifier.

In an active transceiver circuit according to embodiments of the present invention, the averaging circuit, more particularly the low pass filtering thereof may be adapted for filtering out cross-talk originating from the high bitrate input data signal and for allowing to pass the edges of the low bitrate data signal with an edge amplitude reduction of 30% or less.

In a fourth aspect, the present invention provides an active transceiver circuit according to embodiments of the third aspect of the present invention incorporated in an active bidirectional transceiver.

Hence, in this fourth aspect, the present invention provides an active bidirectional transceiver including an active transceiver circuit according to embodiments of the third aspect, wherein the transceiver further comprises a third transmission line coupled to the differential input/output port and arranged for being coupled to the inner conductor of the single ended transmission medium, and a fourth transmission line coupled to the differential input/output port and arranged for being coupled to the conductive shield layer of the single ended transmission medium. The fourth transmission line may be end terminated.

In an active bidirectional transceiver according to embodiments of the present invention, the differential output driver may comprise two invertors for driving the third and the fourth transmission lines in a complementary way.

In an active bidirectional transceiver according to embodiments of the present invention, the third transmission line may be AC coupled. A third impedance (Z3) may be coupled to the third transmission line for device power communication.

The fourth transmission line may also be AC coupled. A fourth impedance may be coupled to the fourth transmission line (322) for improved balance.

The third impedance may include at least an inductor. The third impedance may include at least two components in series. The first component connected to the first transmission line may be adapted for allowing edges of the high bitrate input data signal to pass with an edge amplitude reduction of not more than 30%. The second component may be adapted for allowing the low bitrate data signal to pass such that the signal restore circuit is able to recover the low bitrate output data signal substantially without errors.

The third impedance may comprise at least a Ferrite Bead.

In a fifth aspect, the present invention provides a data communication system comprising a single ended transmission medium utilizing a common path for both transmission and reception and having two extremities, the transmission medium being coupled at both extremities to an active bidirectional transceiver. One of the bidirectional transceivers may be a transceiver according to embodiments of the second aspect of the present invention. Another one of the bidirectional transceivers may be a transceiver according to embodiments of the fourth aspect of the present invention.

In particular embodiments of the fifth aspect, the present invention provides a data communication system comprising a single ended transmission medium utilizing a common path for both transmission and reception and having two extremities, the transmission medium being coupled at one extremity to an active bidirectional transceiver according to embodiments of the second aspect of the present invention, and at the other extremity to an active bidirectional transceiver according to embodiments of the fourth aspect of the present invention.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

BRIEF DESCRIPTION OF THE DRAWINGS

In the different figures, the same reference signs refer to the same or analogous elements.

DETAILED DESCRIPTION OF ILLUSTRATIVE EMBODIMENTS

The present invention will now be described with respect to particular embodiments and with reference to certain drawings, but the invention is not limited thereto, but is only limited by the claims. The drawings described are only schematic and are non-limiting. In the drawings, the size of some of the elements may be exaggerated and not drawn on scale for illustrative purposes. The dimensions and relative dimensions do not necessarily correspond to actual reductions to practice of the invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

The invention will now be described by a detailed description of several embodiments of the invention. It is clear that other embodiments of the invention can be configured according to the knowledge of persons skilled in the art without departing from the technical teaching of the invention as defined by the appended claims.

In a typical bidirectional communication system, a transmitter and a receiver operate simultaneously and at the same or at a different frequency for sending and receiving signals, respectively, over a common single ended transmission medium utilizing a common path for both transmission and reception, e.g. a coaxial or non-coaxial cable. The present invention relates to transceivers for coupling a transmitter, a receiver and power to a single ended transmission medium. Signals are differentiated by the direction in which the respective signals are traveling and by their relative bitrates: in one direction a high bitrate data signal is propagating, whilst in the opposite direction a low bitrate data signal is propagating.

Figure 1:
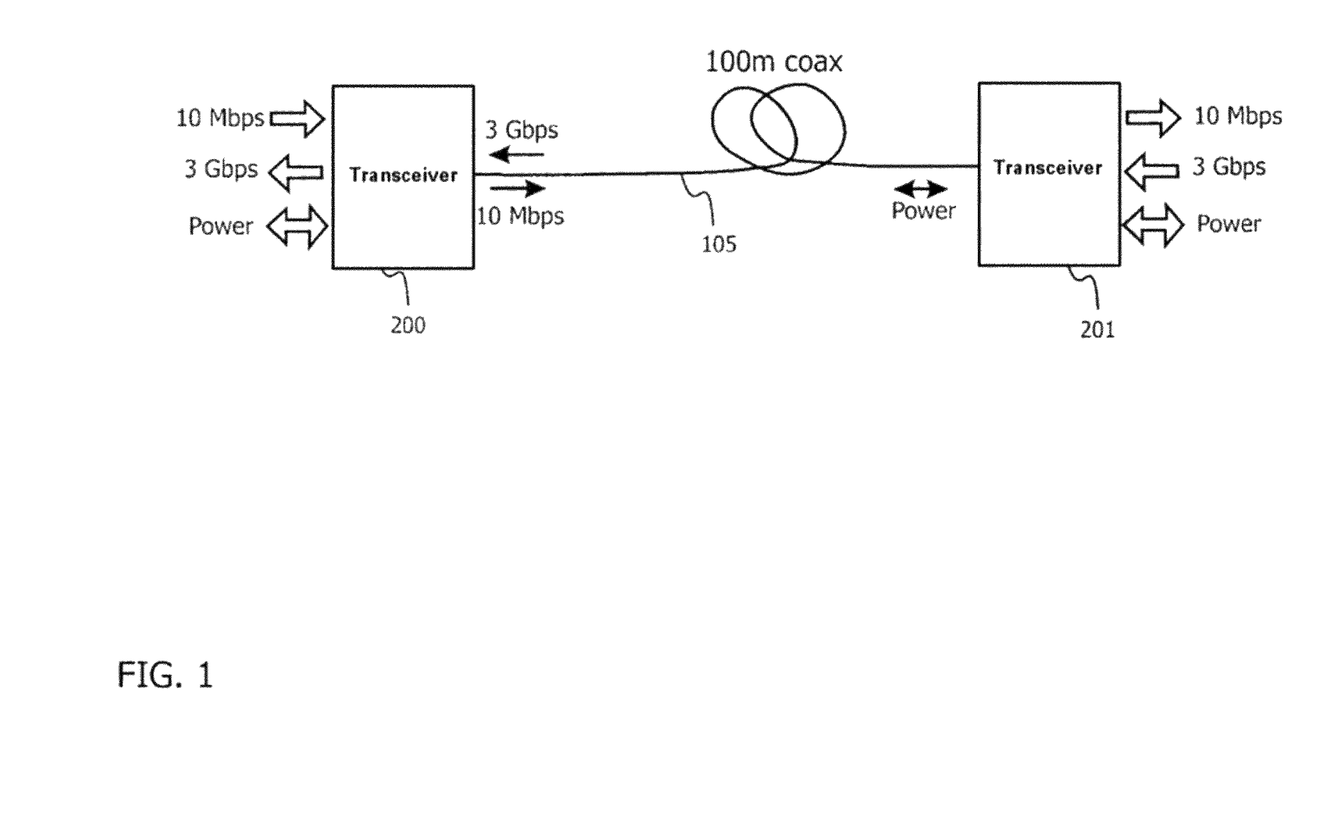
FIG. 1 illustrates a communication system according to an embodiment of the present invention, including a single ended transmission medium utilizing a common path for both transmission and reception, with two transceivers having high bitrate communication in one direction, low bitrate communication in the opposite direction and power communicated over the transmission medium.

A first bidirectional transceiver 200 in FIG. 1 couples a first transmitter and a first receiver to a common transmission medium 105 at one end, and a second bidirectional transceiver 201 couples a second transmitter and a second receiver to the common transmission medium 105 at the other end. In embodiments of the present invention, both transceivers 200, 201 are further adapted, by provision of dedicated elements (see further) such as impedances Z1, Z2, a low pass filter in output driver 191, a signal restore circuit 317, provision of a reduced low bitrate amplitude by output drivers 191, 192, for communicating device power over the transmission medium 105 in a way that the communication is preserved, so that very low final bit error rate is achieved in both directions. In embodiments of the present invention, the direction of device power communication can be fixed in one direction, or fixed in the other direction, or can be chosen freely depending on circumstances and/or needs of particular devices coupled to the transmission medium 105.

The operation of the transceiver circuits 200, 201 according to embodiments of the present invention is demonstrated hereinbelow for digital signaling, for the sake of keeping the explanations simple. Multiple level signaling and analogue signaling can benefit from the present invention in the same way using same or similar measures. Moreover, the operation of the transceiver circuits 200, 201 is illustrated for driving a coaxial cable as a common single ended transmission medium. However, the invention is not limited thereto; also non-coaxial cables may be used. In preferred embodiments, the single ended transmission medium is a shielded transmission medium, which reduces EMI radiation.

Implementation of the proposed circuits can be in many types of chip technology, including CMOS, BICMOS, Bipolar, SiGe, even by using discrete components. Indicated grouping of parts of the circuits may help for suggesting which parts can be arranged on a same chip, however, it should not be limited thereto.

FIG. 1 shows a basic setup of a communication system according to embodiments of the present invention. A first bidirectional transceiver 200 and a second bidirectional transceiver 201 are each connected to an opposite extremity of a length of transmission medium, e.g. 100 m of coaxial cable 105 as illustrated in FIG. 1.

In a first direction (left to right in the drawings illustrated), transceiver 200 couples a low bitrate data signal (bitrate at least 3 times lower than the high bitrate, e.g. Mbps) to a common transmission medium, e.g. coaxial cable 105, and sends it to a second transceiver 201 at the other end (far end) of the common transmission medium 105.

In a second direction (right to left in the drawings illustrated), the second transceiver 201 at the far end of the common transmission medium 105 couples a high bitrate data signal (bitrate 270 Mbps or higher, e.g. 3 Gbps) to the common transmission medium, e.g. coaxial cable 105, and sends it to the first transceiver 200 at the other end, e.g. the near end of the common transmission medium 105.

In any direction, device power may be simultaneously communicated over the transmission medium 105.

In a particular set-up (not illustrated in detail in the drawings), the first transceiver 200 is part of a frame grabber, and the second transceiver 201 is integrated in a camera device, and the device power communicated is in the left to right direction, i.e. from the frame grabber to the camera device. The camera is powered through the transmission medium 105 by the frame grabber.

In another particular set-up (not illustrated in detail in the drawings), the first transceiver 200 is part of a display device, like an LCD monitor, and the second transceiver 201 is integrated in a personal computer (PC), and the device power communicated is in the right to left direction, i.e. from the PC to the monitor. The monitor is powered through the transmission medium 105 by the PC, thus eliminating part or whole of the elsewise required power supply connection between the monitor and the main power supply.

Other particular set-ups (not illustrated in detail in the drawings) may require power communication direction to switch from time to time, or from situation to situation, depending on circumstances. For example, a personal computer (PC) connected at one end of a transmission medium 105 can be a battery powered lap-top, that may be powered by a monitor that itself is connected to the mains power supply, besides being connected to the other end of the transmission medium 105. The monitor can thus provide power to operate the laptop, and to charge its batteries. At another moment in time the laptop has enough power to drive a monitor (the same or another one) that is not connected to the mains. This powering of the monitor then may happen through the same transmission medium 105 but now in the opposite direction, while simultaneously driving high bitrate data from the PC to the monitor to display data, e.g. a movie.

The proposed system according to embodiments of the present invention allows DC currents to be communicated at a current level of at least 1 amperes, delivering at a voltage level of e.g. 24 V, the respectable power level of 24 Watt. With some expected voltage drop over the transmission medium 105, 20 Watt could still be remaining as device power, which is sufficient for many types of cameras and monitors to get powered and/or charged.

As an example it is further assumed, for the ease of explanation only, that the high bitrate data signal is 3 Gbps, and the low bit rat data signal is at 10 Mbps, both in the non-return-to-zero (NRZ) format. Other bitrates can be used for the high bitrate data signals (bitrate 270 Mbps or higher) and the low bitrate data signals (bitrate less than a third of the high bitrate), as well as other coding formats.

Figure 2:
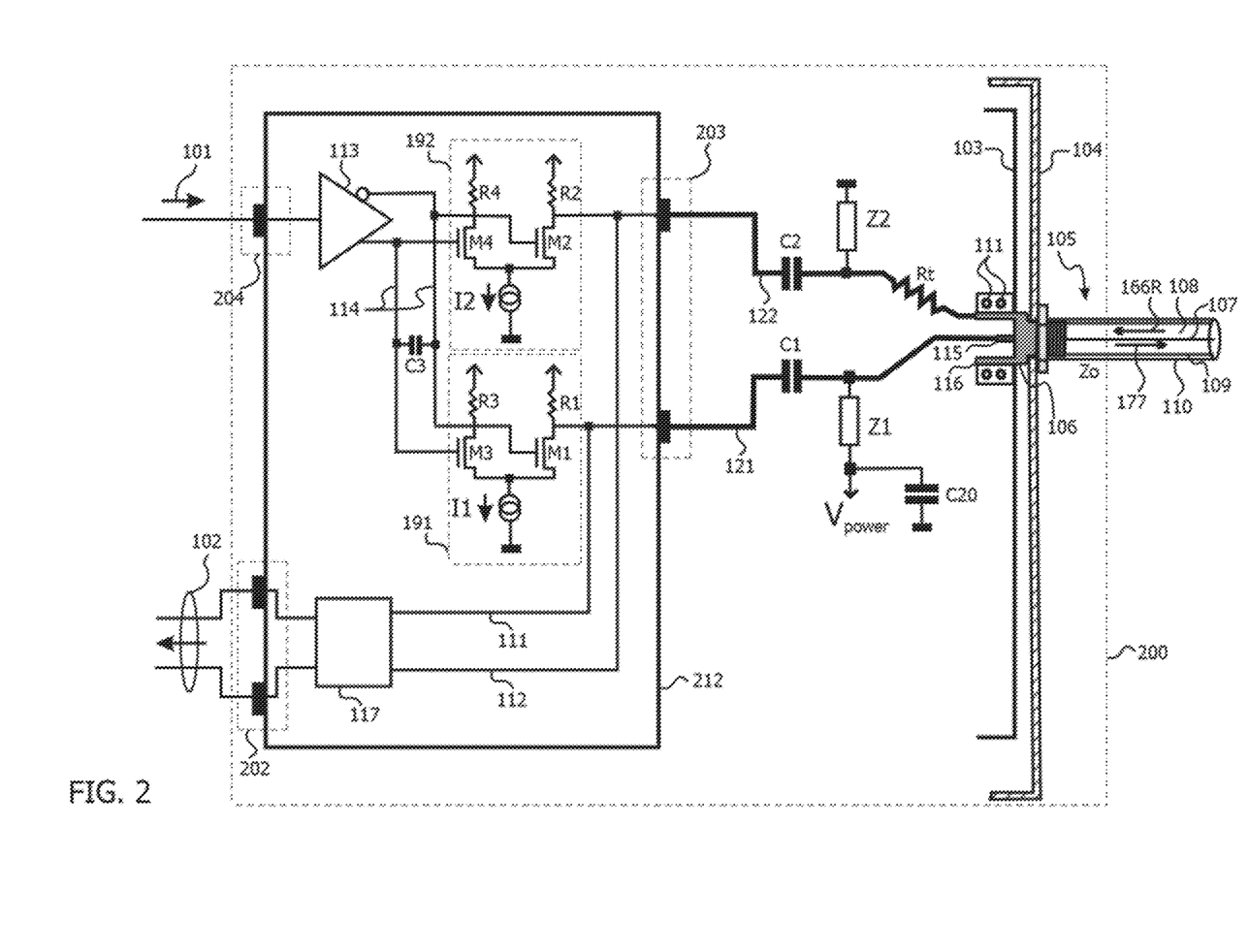
FIG. 2 illustrates an active transceiver circuit according to an embodiment of the present invention whereby high bitrate data is received and equalized, low bitrate data is transmitted and device power is communicated over a transmission medium.

FIG. 2 shows in more detail an embodiment of the first transceiver 200 according to embodiments of the present invention, whereby first transceiver 200 has high bitrate data reception from the transmission medium 105, low bitrate data transmission to the transmission medium 105, and device power communication over the transmission medium 105. FIG. 2 illustrates an active transceiver circuit 212 comprising unidirectional input and output ports 204 and 202. In practice output port 202 may be implemented in a differential form, since high bitrate communication over Printed Circuit Boards (PCBs) is preferably done in a differential way. It can, however, as well be of a single ended type (not illustrated). The low bitrate port 204 is shown as a single ended port, since a port with a bitrate of 10 Mbps is typically implemented in single-ended form. It can, however, as well be of a differential type. The active transceiver circuit 212 also comprises a common input/output port 203 for being coupled to the transmission medium 105.

A low bitrate input signal 101 is received from a first transmitter (not illustrated) at a first input port 204 connected to a pre-driver 113. Optionally, if the low bitrate signal 101 is a single ended signal, the pre-driver 113 generates from the input signal 101 a differential signal, and shapes the differential signal on differential node 114. Alternatively, if the low bitrate signal 101 is already a differential signal, the pre-driver 113 may only have the shaping function, not the conversion function for generating the differential signal.

Differential node 114 drives a first single ended output driver 191. The output driver 191, in the embodiment illustrated, comprises output driving transistors M1, M3 which form with a current source I1 a CML (Current Mode Logic) output driver stage. The latter is terminated, e.g. by means of source termination resistors R1, R3 for matching the source impedance to the characteristic impedance of first transmission lines 121 coupled between a common input/output port 203 and the common transmission medium, e.g. coaxial cable 105.

Differential node 114 also drives a second single ended output driver 192. The second single ended output driver 192, in the embodiment illustrated, comprises output driving transistors M2, M4 which form with a current source I2 a CML (Current Mode Logic) output driver stage. The latter is terminated, e.g. by means of source termination resistors R2, R4 for matching the source impedance to the characteristic impedance of second transmission lines 122 coupled between the common input/output port 203 and the common transmission medium, e.g. coaxial cable 105, through end-termination resistor Rt.

The single ended signals generated by the first and second single ended output drivers 191 and 192 leave the transceiver circuit, for example active transceiver circuit 212 via the common input/output port 203, which is a second differential port, through first and second wires or transmission lines 121, 122. These first and second wires or transmission lines 121, 122 are connected by means of a coax connector 106 to the coaxial cable 105 with characteristic impedance Z0. The coaxial cable 105 comprises an inner conductor 107, surrounded by a tubular insulating layer 108 typically made from a flexible material, all of which is then surrounded by another conductive shield layer 109 and then finally covered again with a thin insulating layer 110 on the outside. The coax connector 106 has a central pin 115 for connecting to the inner conductor 107 of the coaxial cable 105, and one or more shielding pins 116 for connecting to the conductive shield layer 109 of the coaxial cable 105. In the embodiment illustrated in FIG. 2, the first transmission line 121 is connected to the central pin 115 of the coax connector 106. The second transmission line 122 is connected to the shield 109 of the coax connector 106. The second transmission line 122 is terminated, e.g. close to the coax connector 106, with a termination resistor Rt, either to a power plane that is also connected to the shielding pin of the coax connector 106, or as shown in FIG. 2, directly to a shielding pin 116 of coax connector 106. Resistor Rt has an impedance that matches closely the characteristic impedance Z0 of coaxial cable 105. In this way, second transmission line 122 is source- and end-terminated by source termination resistor R2 and end termination resistor Rt, respectively. First transmission line 121 is source terminated by source termination resistor R1 and continues as a transmission line through coaxial cable 105, by means of its inner conductor 107, and is terminated at the far end of the coaxial cable 105 in the transceiver 201 by resistor R5 (illustrated in FIG. 4). The coax connector shield, formed by the one or more shielding pins 116, is preferably also connected to a power plane, preferably the GND power plane, e.g. in a PCB 103, for example though VIAs 111. In the embodiment illustrated, the coaxial cable 105 is attached by means of the coax connector 106 onto a PCB 103. For good performance of the system, it is advantageous that the coax connector 106 is connected in a low inductive way with the main ground plane in the PCB 103. Therefore a set of vias (two vias 111 are indicated, but more may be used) may be provided at the footprint of the coax connector 106 for good connection. Further, a casing 104 of the system is preferably also connected intimately to the coax connector 106, e.g. through a nut that screws the coax connector 106 against the casing, or through any other conductive clamping means including e.g. a conductive gasket.

Transmission lines 121 and 122 can be AC coupled, e.g. by providing capacitors C1 and C2 (shown in FIG. 2) on the first transmission line 121 and second transmission line 122, respectively, i.e. somewhere between their source and end termination. In alternative embodiments such AC coupling can for example be obtained by placing the capacitors C1, C2 between the terminated transmission lines 121, 122 themselves and the single ended drivers 191 and 192 respectively (not shown).

Single ended output drivers 191 and 192 are designed to be similar or even equal, generating output signals on first and second nodes 111 and 112 at the start of transmission lines 121 and 122 that are as much as possible the same (with a maximum deviation of 20% in amplitude), and substantially in phase (skew less than 30% of a unit interval (UI) at the low bitrate speed). The signals on the first and second nodes 111, 112 are each applied to an input of a high bitrate receiver 117. In that way, the differential component between the input of the high bitrate receiver 117 will be zero, or very small, such that receiver 117 sees as little as possible, or even no cross-talk stemming from the low bitrate outbound data signal generated by single ended output drivers 191 and 192. High bitrate receiver 117 also receives at its input nodes 111, 112 a signal from the single ended transmission medium 105, and generates there from a high bitrate differential signal 102. High bitrate receiver 117, however, also receives at its input nodes 111 and 112 a common mode component stemming from the single ended transmission medium, e.g. coaxial cable 105, that it needs to reject. A person skilled in the art is able to design the high bitrate receiver 117 so as to have a good common mode rejection ratio. High bitrate receiver 117 is further adapted to compensate for the frequency dependent losses in the transmission medium or coaxial cable 105, for example by having incorporated a settable or auto-adaptive equalizer.

In practice, even when first and second single-ended output drivers 191 and 192 generate exactly the same output currents, it is still likely that the voltage on nodes 111 and 112 have substantially different transient time behavior due to a difference between termination impedance Rt on the second transmission line 122 and the characteristic impedance Zo of the transmission medium 105. Rt can be a precision resistor having a predetermined resistance value, e.g. 75Ω, but a connected coaxial cable 105, having a predetermined target impedance Zo of e.g. also 75Ω, can in practice deviate from this predetermined target impedance value, e.g. it can be only 72Ω. In this case a few percent of the transmitted low bitrate signal will be present as a differential input of the high bitrate receiver 117, and is likely to generate bit errors at unidirectional output port 202. Other types of imbalances can be due to the quality of the coax connector 106 used, the return loss of the cable 105, the fact that only a single impedance Z1 is used for device power communication (rather than using impedances Z1 and Z2), which will deliver an imbalance, and depending on all parameters involved this may lead to a relatively high level of the transmitted low bitrate signal to become present as a differential input of the high bitrate receiver 117, etc.

Figure 6:
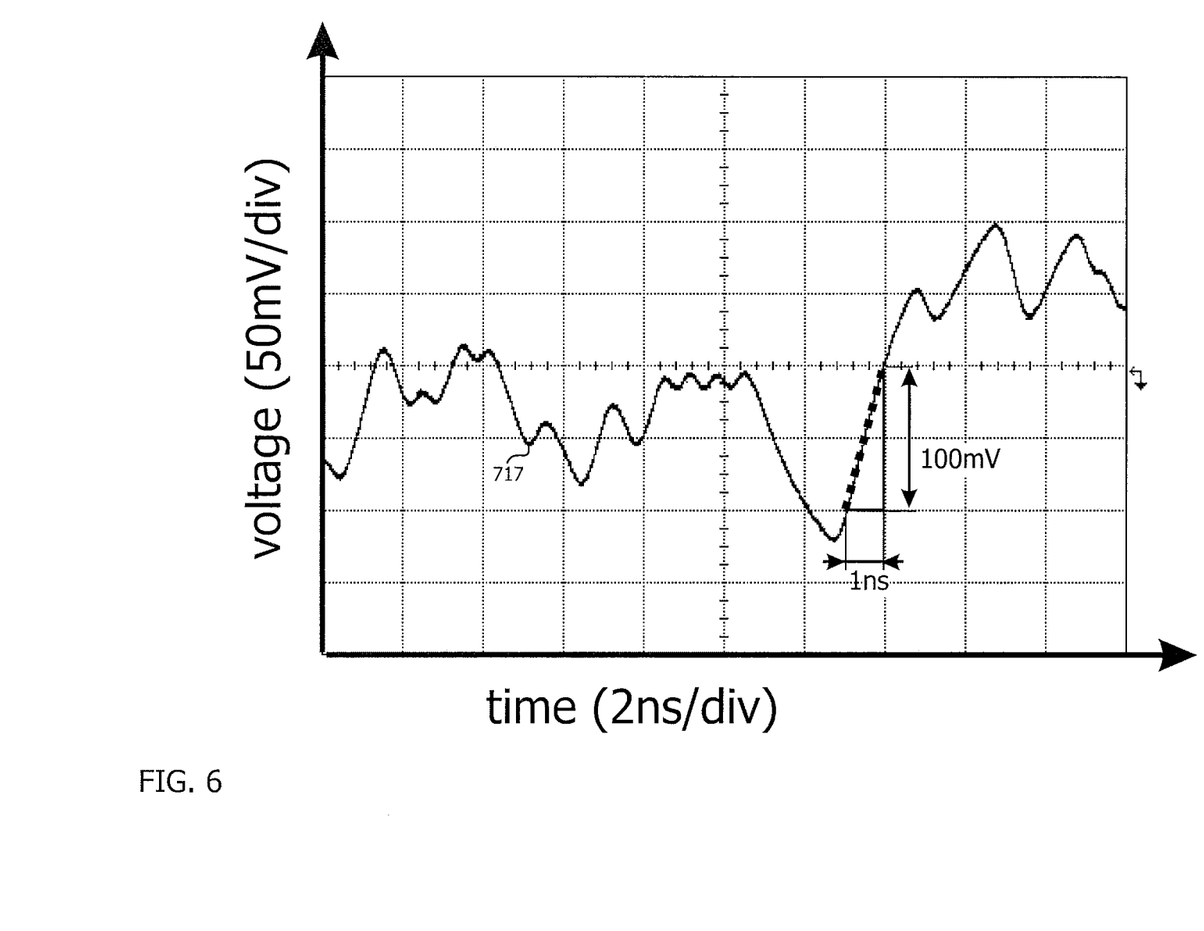
FIG. 6 illustrates the measured voltage transient and maximum slew rate at the receive end of a 150 m coax whereby a PRBS7 pattern was applied with a 600 mV launch amplitude.

In the case that the high bitrate receiver 117 is using an equalizer for providing compensation to frequency dependent losses in the transmission medium 105, the signal to be recovered can be reduced by transmission medium 105 down to a level which is a fraction, such as a few percents, of the starting voltage, for example between 1 and 10%, e.g. between 2 and 5%. As an example only, the signal to be recovered can be reduced by the transmission medium 105 down to a level of 10 millivolts when starting from e.g. 600 mV. FIG. 6 shows the example of a voltage transient (curve 717) at the output of a 150 m coaxial cable (of type Belden1694A) when having at its input a signal of a 3 Gbps non-return-to-zero PRBS7 pattern with a launch amplitude of 600 mV. The smallest meaningful oscillations are about 10 mV, about one sixtieth of the 600 mV starting amplitude. The "0101" transitions in the high bitrate data signal have thus been reduced by −36 dB.

A few percent of cross-talk from the outbound low bitrate signal can in this case be very harmful for good high bitrate signal equalization and data recovery.

In order to cope with this problem, according to one embodiment it is advised to use a signal amplitude for the low bitrate data signal that is smaller than 50%, preferably smaller than 30% and most preferred about 15%, but always larger than 1% of the launch amplitude of the high bitrate data signal (166T). Good example values are 600 mV launch amplitude of the high bitrate data signal at the level of transceiver 201, and 100 mV for the transmit amplitude of the low bitrate data signal, generated by single ended output drivers 191 and 192 in transceiver 200. Making the signal amplitude for the low bitrate data signal smaller than 1% of the launch amplitude of the high bitrate data signal would result in amplitudes that would render the integrity of the transmitted low bitrate data susceptible to external influences and system noise. The signal amplitude for the low bitrate data signal can be set by choosing the appropriate DC current level for current sources I1 and I2 in the single ended output drivers, as is known by the person skilled in the art.

A second way to cope with this problem is to keep the maximum slew rate of the low bitrate data signal generated at first and second nodes 111, 112 always to be at least 5 times, preferably at least 20 times smaller than the maximum slew rate of the received high bitrate data signal (166R) at transceiver 201. The maximum slew rate is the maximum rate of change of the signal, e.g. in V/s; this maximum is likely to be present when the signal is transitioning from one level to another. The actual value of the maximum slew rate for any signal is application dependent.

Assuming the measurement of FIG. 6, i.e. at 3 Gbps, after a cable length of 150 meters, a maximum slew rate of 100 mV/1 ns=$10^{+8}$ V/s is obtained. The maximum slew rate of the low bitrate signal, assuming 20 n rise/fall times over a 100 mV amplitude, equals to 100 mV/20 ns=$5.10^{+6}$ V/s. A ratio of 20 is the result, which is sufficient to operate with margin. For shorter cable lengths, the margin becomes only better. So to conclude, this is a system that shows margin for cables having 0 dB up to −36 dB of attenuation.

According to this embodiment, the single ended output driver stages 191 and 192 have to be adapted so as to limit their output maximum slew rate. In the illustrated example of transceiver 200, this may be achieved by having a pre-driver 113, that is generating a differential signal of which the variations are slow enough: by letting pre-driver 113 have a high output impedance (not shown) and by using a "slowing down" capacitor C3, a small maximum slew rate differential signal on the differential output node 114 can be generated. This pre-driver 113 can furthermore also be adapted to bring the signals at differential node 114 to the right differential amplitude and common mode level, and to take care of the imperfections of the incoming signal 101 on port 204. The single-ended output drivers 191 and 192 illustrated in FIG. 2, are exemplified by differential CML ports of which the unused second output nodes are terminated in resistors R3 and R4 respectively. Other types of slowly varying single ended output drivers can optionally be designed by the person skilled in the art. In accordance with embodiments of the present invention, the nature of these drivers is such that they both generate the same signals, i.e. between them having mainly a common mode component, and a differential mode component that is as small as possible (the amplitude of the differential mode component being not more than 20% of the amplitude of the common mode component).

Figure 7:
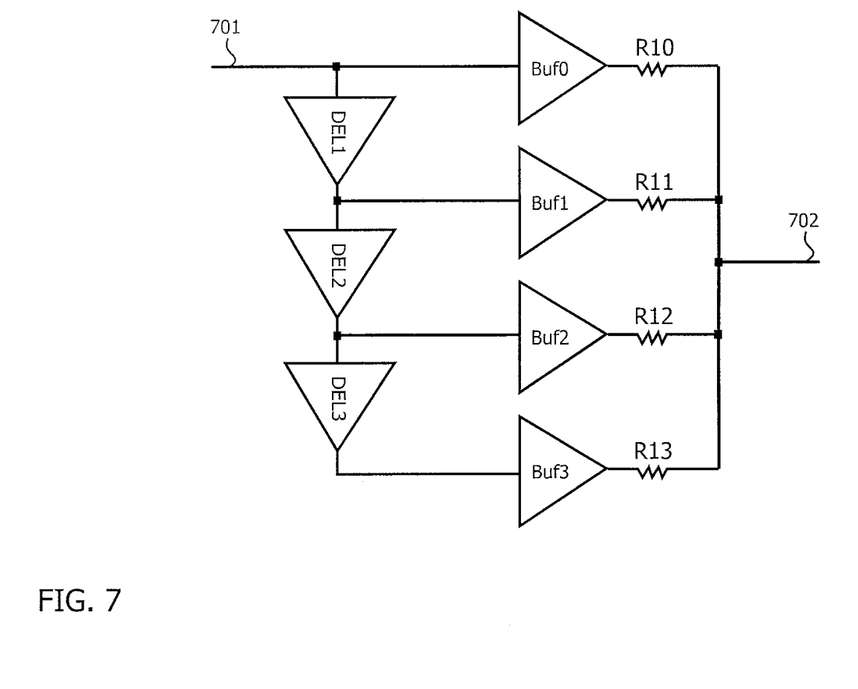
FIG. 7 illustrates yet another embodiment for generating reduced slew rate digital signals based on distributed output buffers.

A second possible way of generating a slowly varying single ended output is demonstrated in FIG. 7 and it is based on a distributed set of output buffers. The input signal (701) is here of the single-ended type. The input signal 701 itself and three delay generators DEL1, DEL2, DEL3 generate driving signals for buffering stages Buf0, Buf1, Buf2 and Buf3. These four buffering stage are switched with e.g. fixed delay in response to the delay elements DEL1, DEL2 and DEL3. Keeping the slew rate at the input of Buf0, Buf1, Buf2 and Buf3 small by capacitive loading (not shown) will deliver then full control of the output slope. The termination resistor is now also distributed. For achieving e.g. an effective termination resistor of 50Ω, and having four buffers, R10 to R13 can each be given a value of 200Ω. The number of output buffers Buf0, Buf1, Buf2, Buf3 and delay elements DEL1, DEL2, DEL3 can be further increased for generating finer steps resulting in a lower slew rate. The delay elements DEL1, DEL2, DEL3 and buffers Buf0, Buf1, Buf2, Buf3 can be made in various ways; an easy way is to use two cascaded inverters but other possible implementations lie within the skills of a person skilled in the art.

For analogue signal transmission and for multilevel signal transmission in the low bitrate signal, it is the same principle that holds: making two similar single ended driving signals with small maximum slew rate always at least 5 times, preferably at least 20 times smaller than the maximum slew rate in the received high bitrate data signal (166R) at transceiver 201.

Further, it should also be noted that the transmission lines 121 and 122 between the common input/output port 203 and the coax connector 106 can be kept very short, e.g. a few centimeter or lower, down to a millimeter. Even then, they still may be AC coupled, e.g. by carrying AC coupling capacitors C1 and C2. The coax connector 106 is not essential to the invention itself. The single ended-medium 105 can also be permanently connected, crimped-on, soldered and/or fixed to the position where signals from transmission lines 121 and 122 are converted into single ended signaling through termination resistor Rt.

For communication of device power, an impedance Z1 has to be connected to transmission line 121, between the AC coupling capacitor C1 and the connection to the central pin 115 of the connector 106 that connects to the core 107 of the transmission medium 105, for drawing DC current through the transmission medium 105. Vpower, at the other connection point of impedance Z1, is the connection point for the communication of the device power. Between the node Vpower and the ground a decoupling capacitor C20 can be connected, as shown in FIG. 2.

Optionally, in case the ratio between maximum slew rates of the received high bitrate signals (166R) and the low bitrate data signals (177) is a factor of 10 or smaller, it is advised that a second impedance Z2, having preferably the same constitution and value as impedance Z1, is used as indicated in FIG. 2. It is to be connected at the second transmission line 122 between the AC coupling capacitor C2, and the termination resistor Rt, providing improved balance. The second lead of impedance Z2 can be connected to the same node as the node the resistance Rt is terminated to, which is preferably and as indicated in FIG. 2, to GND.

Z1 (and possibly, if present, Z2) need(s) to have a low impedance at zero Hertz (DC); however, it (they) should let pass the edges from the low bitrate signal 101 and the edges from the high bitrate signal 166 over the respective transmission lines 121 and 122 they are coupled to. For all these edges a high impedance is expected, to avoid reflections and edge height reductions. Hence, the use of an inductance for the impedances Z1 and Z2 would be particularly useful. Using aforementioned bitrates, amplitude levels and maximum slew rates, it is however difficult to implement Z1 (and possibly Z2) just by a single inductor without disturbing the low and high bitrate signals passing by.

Figure 3:
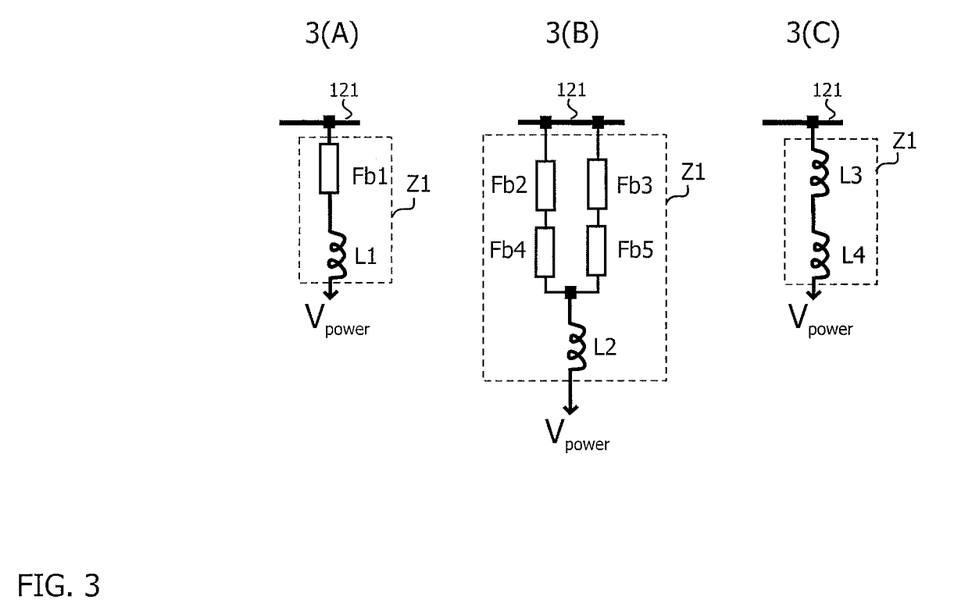
FIG. 3 illustrates high frequency implementations of an impedance useful to communicate device power over a single ended transmission medium according to embodiments of the present invention.

FIG. 3 shows workable implementations of the impedance Z1 (and Z2). A first embodiment for impedance Z1 (and Z2) is by using one ferrite bead Fb1, as exemplified in FIG. 3(A), or another component that has a low impedance at low frequency but a high impedance at high frequency. The ferrite bead Fb1 is placed in series with a large inductor L1, in case of the example bitrates, of 100 μH. The series-coupled inductor L1 has a large enough impedance to let the edge of the low bitrate data signal pass without reducing its edge amplitude by more than 30%. The ferrite bead Fb1 has a small parasitic capacitance, allowing the high bitrate signal to pass in a way that the bits in the data stream can still be recovered without error by receiver 117. It is this ferrite bead Fb1 that has to be connected to the transmission line 121 (and/or 122 for Z2).

An example ferrite bead FB1 with good high frequency properties and current conduction properties (0.5 A) is the bead "FBMH1608HM102" from the company "Taiyo Yuden". An example inductor L1 of 100 μH with good low frequency and current conduction properties is the inductor with part number "B82111EC025" from the company "EPCOS".

An option to allow a higher current supply is to work as in FIG. 3(B). By having four ferrite beads Fb2, Fb3, Fb4, Fb5 connected as shown, i.e. twice a series connection of two ferrite beads, and these series connections being coupled in parallel, a current supply up to 1 A becomes possible. The parallel coupling of the series connections of ferrite beads is connected in series to an inductance L2. The inductance L2 can be of the same type as aforementioned inductance L1, as discussed with respect to FIG. 3(A).

A third option is to use two inductors L3 and L4 in series, as exemplified by FIG. 3(C). The inductor L3 connected to the transmission line 121 has to be a small inductor such that its capacitive parasitic is also low enough so that it allows the high bitrate signal to pass by in a way that the bits in the data stream can still be recovered by receiver 117. Furthermore the inductor L3 should have good high frequency characteristics allowing the high bitrate signal to pass in a way that the bits in the data stream can still be recovered without error by receiver 117. For example, a suitable inductor is an inductor of 1 μH, part number "1812PS-102" from the company Coilcraft. The series-coupled inductor L4 has a large enough impedance to let the edge of the low bitrate data signal pass without reducing its edge amplitude by more than 30%, e.g. a 40 μH coil from EPCOS, with part number "B82111EC023". With the examples given, L3 and L4 allow a DC current conduction of 2 A, making them an excellent combination for device power communication.

In order to avoid high frequency stubbing, the trace length between the transmission line 121 (122) and the connection to impedance Z1 (Z2) should be kept as short as possible, but may comprise printed circuit board (PCB) features that are inductive, like a via or alternatively, a small efficient PCB inductor that consists of a wound trace.

The inductance value of the used inductor, L1, L2 or L4 should be large enough to let the edges of the low bitrate data signal pass. It is, however, not required to pass the full low frequency content of the low bitrate data signal. This would require in many cases a very large L1, L2 or L4. At the transceiver 201 at the far end the edges of the original signal and the edges' polarity should be retrieved, and the original signal should be restored, as is explained further on.

Figure 4:
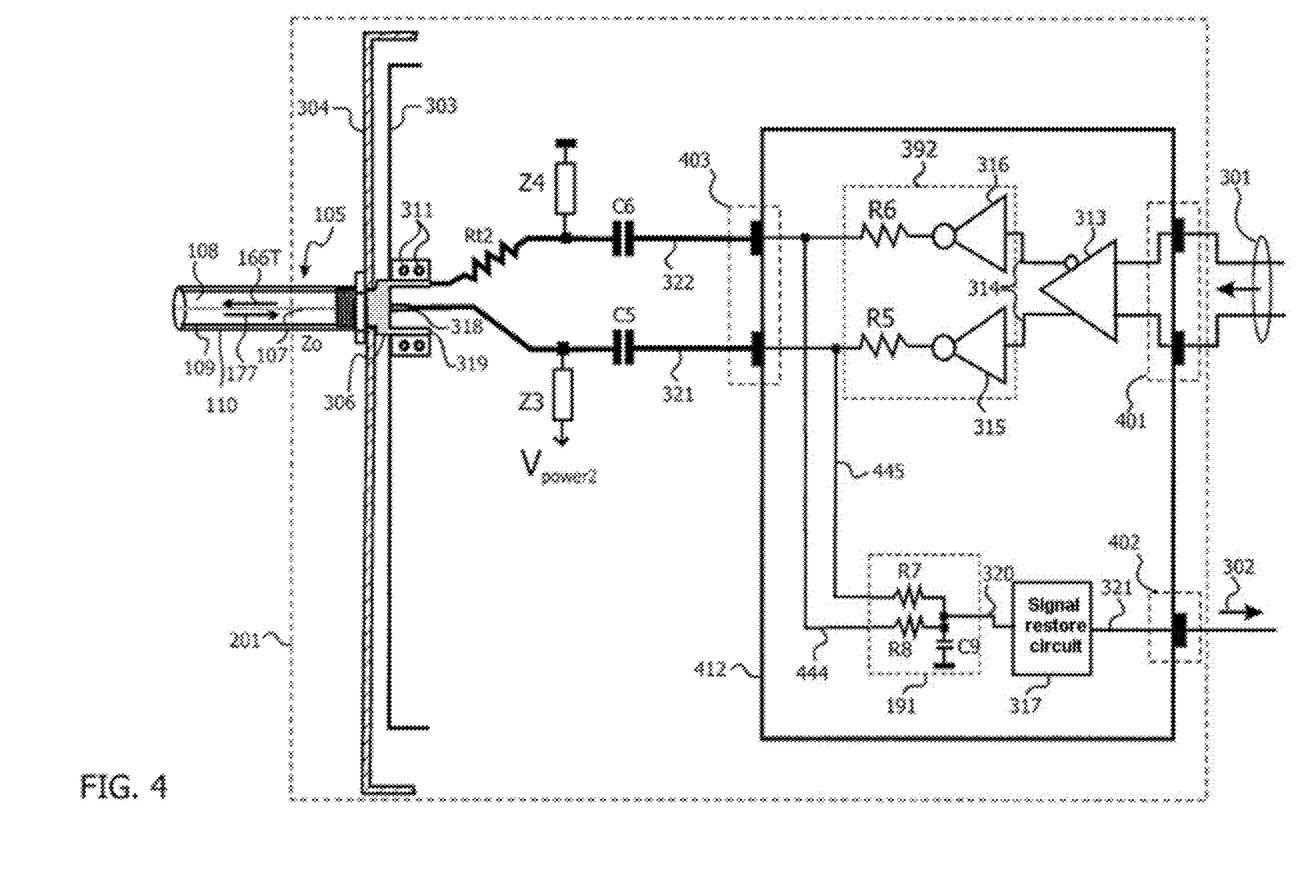
FIG. 4 illustrates an active transceiver circuit according to a further embodiment of the present invention whereby low bitrate data is received and restored, high bitrate data is transmitted and device power is communicated over a transmission medium.

FIG. 4 illustrates a transceiver 201 of an embodiment of the present invention for receiving the low bitrate data signal 177 (that has become edge like), transmitting a high bitrate data signal 301 and communicating device power.

The transceiver 201 comprises a transceiver circuit 412 having a differential input port 401 for receiving a high bitrate data signal, a unidirectional output port 402 for outputting a low bitrate data signal, a common input/output port 403 and coupling circuitry for coupling the signals from the common input/output port 403 to the transmission medium 105 and vice versa.

In transceiver 201, the low bitrate signal 177 that comes from the transmission medium 105 and that has to be recovered is not likely to need an equalizing function, since for the given length and bitrate of the transmission medium, e.g. coaxial cable 105, not much frequency dependent losses are to be expected. Nevertheless, in embodiments of the present invention, an equalizer may be provided in the transceiver 201 to correct for frequency dependent losses due to the transmission medium 105.

A high bitrate differential data signal 301 is delivered to differential input port 401 of the transceiver circuit 412, and is being received by pre-driver 313, that on its turn drives a differential driver 392 through a differential signal on differential node 314. Differential driver 392 is exemplified in FIG. 4 by two inverters 315, 316 and termination resistors R5 and R6 driving a third and fourth transmission line 321 and 322 in an antagonistic, complementary way. This is not intended to be limiting the present invention; the differential driver 392 can have any suitable implementation. The third and fourth transmission lines 321 and 322 start at the differential bidirectional port 403 and both continue up to a connector 306, e.g. coax connector, connecting to the single transmission medium, e.g. the coaxial cable 105.

The third and fourth transmission lines 321, 322 are connected by means of a connector, e.g. a coax connector 306, to the transmission medium, e.g. coaxial cable 105, with the aforementioned characteristic impedance Z0. The coax connector 306 has a central pin 318 for connecting to the inner conductor 107 of the coaxial cable 105, and one or more shielding pins 319 for connecting to the conductive shield layer 109 of the coaxial cable 105. In the embodiment illustrated in FIG. 4, the third transmission line 321 is connected to the central pin 318 of the coax connector 106. The fourth transmission line 322 is connected to the shielding pins 319 of the coax connector 306. The fourth transmission line 322 is terminated, e.g. close to the connector, e.g. coax connector 306, with a termination resistor Rt2, either to a power plane that is also connected to the one or more shielding pins 319 of the coax connector 306, or as shown in FIG. 4, directly to the one or more shielding pins 319 of coax connector 306. Resistor Rt2 has an impedance that matches closely the characteristic impedance Z0 of coaxial cable 105. In this way, fourth transmission line 322 is source- and end-terminated by source termination resistor R6 and end termination resistor Rt2, respectively. Third transmission line 321 is source terminated by source termination resistor R5 and continues as a transmission line through coaxial cable 105, assuming to be terminated at the near end of the coaxial cable 105 in the transceiver 200 by resistor R1 (see FIG. 2). The one or more shielding pins 319 of the coax connector 306 are preferably also connected to a power plane, preferably the GND power plane, e.g. in a PCB 303, for example though VIAs 311. In the embodiment illustrated, the coaxial cable 105 is attached by means of the coax connector 306 onto a PCB 303. For good performance of the system, it is advantageous that the coax connector 306 is connected in a low inductive way with the main ground plane in the PCB 303. Therefore a set of vias (two vias 311 are indicated, but more may be used) may be provided at the footprint of the coax connector 306 for good connection. Further, a casing 304 of the system is preferably also connected intimately to the coax connector 306, e.g. through a nut that screws the coax connector 306 against the casing 304, or through any other conductive clamping means including e.g. a conductive gasket.

Transmission lines 321 and 322 can generate AC coupling, e.g. by having capacitors C5 and C6 in their path, either somewhere in the middle (as shown in FIG. 4), i.e. somewhere between source and end termination, or between terminated transmission lines themselves and the differential driver 392 (not shown).

Differential output driver 392 is designed to generate primarily complementary signals at the start of transmission lines 321 and 322, i.e. with a differential mode signal and small common mode signal. In that way, taking the average voltage of both outputs of the differential driver 392 on nodes 444 and 445, will give little time dependent variation due to edges in the outbound signal, i.e. due to switching or antagonistic maximum slew rates on nodes 444 and 445. However, it is impossible to realize that the differential driver 392 at high bitrate becomes fully complementary, i.e. without any common mode components, in all transistor corners and at all temperatures. Also an imbalance at the level of the connector 306, or a mismatch between the termination resistor Rt2 and the characteristic impedance Zo of the coaxial cable 105 will generate a high speed average voltage component. Therefore, an averaging circuit 191 is provided which, besides taking the average between the voltages on nodes 444 and 445, also provides a low pass filtering action, after which its output signal is sent to a signal restore circuit 317. This can be achieved by coupling each of the nodes 444, 445 to a common node 320 over an impedance R7, R8, respectively, the resistors R7 and R8 having same value. At the common node 320, a capacitor C9 is introduced, making from R7 and R8 as well a low pass filter construction. In an alternative embodiment, not illustrated, two capacitors can be introduced, equal in capacitance value, so as to make from R7 and a first one of the capacitors a first low pass filter, and from R8 and a second one of the capacitors a second low pass filter. In this way, by providing a low-pass filter construction, the cross-talk stemming from the outbound signal is filtered out. The −3 dB point of the low pass filter(s) should be low enough to reduce the high frequency components by at least a factor 20, but it should be at a sufficient high frequency so that the edges from the incoming low bitrate signal 177 are not filtered out.

The latter signal will travel mainly through the third transmission line 321 and terminate in resistor R5, thus being fully visible on node 445. Node 444 will essentially not change level due to the incoming low bitrate data signal 177, since this signal will not pass over transmission line 322.

The low bitrate signal 177, will be received in a reduced form at node 320, for example reduced by a factor 2 since averaging circuit 191 may be taking the average between the voltages on nodes 444 and 445.

Assuming that in transceiver 200, the low bitrate signal 101 was launched with the suggested amplitude of 100 mV, the amplitude at the input of the signal restore circuit 317 then has to start with the low signal amplitude of less than 50 mV, as also losses in the transmission medium 105 appear. From the original low bitrate signal 101, at least the edge positions are remaining.

Figure 5:
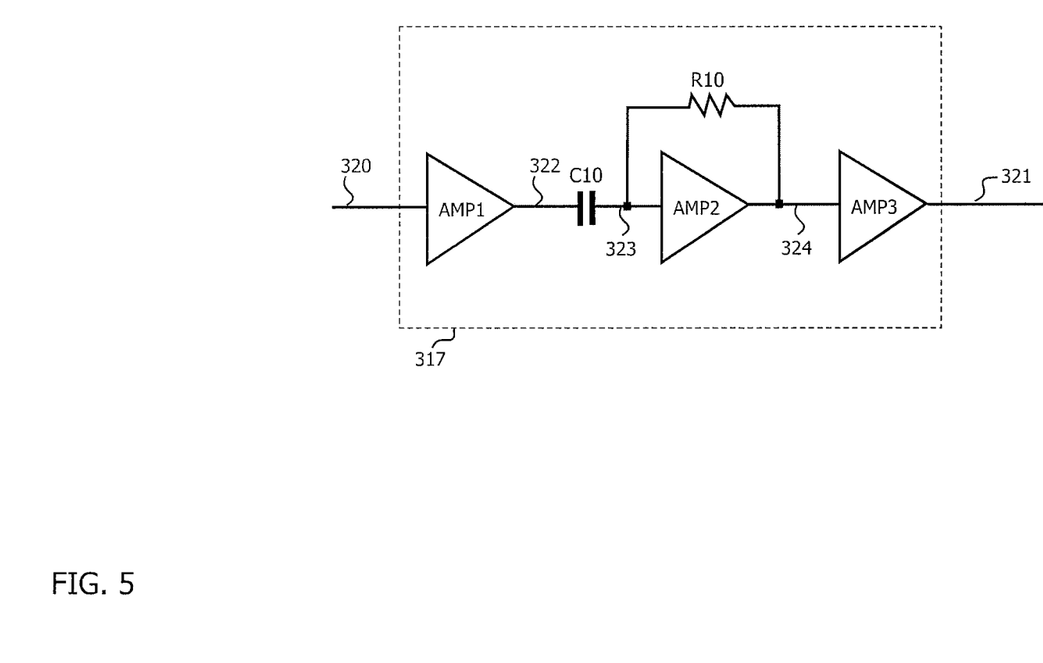
FIG. 5 illustrates yet another embodiment for low bitrate signal restoration.

FIG. 5 shows an example of a signal restore circuit 317. It illustrates how the original low bitrate signal can be retrieved. The averaged signal at node 320 is applied to a first amplifier AMP1, which amplifies the signal from its low amplitude value, e.g. about 50 mV, with a pre-determined amplification factor, e.g. an amplification by a factor of between 5 and 30, up to e.g. 1V. Subsequently a second amplifier AMP2 is AC-coupled through capacitor C10 to the output node 322 of the first amplifier AMP1. The second amplifier Amp2 has a positive feedback from its output node 324 to its input node 323 through a resistor R10. It should have also a positive and negative saturation level, such that it is nicely digitizing and having two stable states. Its output node 324 is connected to an output buffer AMP3 that generates the output signal on node 321. This output signal on node 321 is applied to the unidirectional low bitrate output port 402, where it leaves the transceiver 201 as a low bitrate data signal 302.

When an amplified edge is present on node 322, AC coupling capacitor C10 will conduct the edge through to node 323, positive feedback system AMP2 with R10 takes over this new digital state, and keeps it thanks to the positive feedback through R10. Even when the new digital level in the signal at node 322 leaks away slowly, the value at the output 324 will be retaining itself, waiting for an opposite edge in the signal on node 322 to eventually occur.

For this to operate well, the amplitude of the edge that is present on node 322, must be set by the amplification factor of amplifier AMP1, such that it is large enough to let the AMP2 switch from the one saturation stage to the other. Also the time constant linked to C10 and R10 must be considerably longer than the rise and fall time of the incoming data edges. It should further be short enough to resist in a timely manner to the signal that will be leaking away due to the presence of the impedances, e.g. Z1 and Z3, on the low bitrate signal path.

Having multiple level signaling, a similar system can be made whereby the estimated output state is fed back by positive feedback through a resistor reinforcing softly the present state in a similar way.

For communication of device power, an impedance Z3 should be connected to the third transmission line 321, between the AC coupling capacitor C5 and the connection to the central pin 318 of the connector 306 that connects to the core 107 of the transmission medium 105. Vpower2, at the other connection point of impedance Z3, is the connection point for the communication of the device power in the active bidirectional transceiver 201. A decoupling capacitor can also be connected between the node Vpower2 and ground (not shown).

In case that the transmitted high bitrate date 301 is highly DC unbalanced, it is advised that a second impedance Z4, having the same constitution and value as impedance Z3, is used as connected in FIG. 4. It is to be connected at the fourth transmission line 322 between the AC coupling capacitor C6, and the termination resistor Rt2, providing improved balance. The second lead of impedance Z4 can be connected to the same node as the one to which the resistance Rt2 is terminated to, which is preferably and as indicated in FIG. 4, to GND.

Z3 (and possibly, if present, Z4) need(s) to have a low impedance at zero Hertz; however, it (they) should let pass by the edges from the low bitrate signal 177 and the edges from the high bitrate signal 301 over the respective transmission lines 321 and 322 they are coupled to. For these edges a high impedance is expected, to avoid reflections and edge height reductions. Hence, the use of an inductance for the impedances Z3 and Z4 would be particularly useful. Using aforementioned bitrates, amplitude levels and maximum slew rates, it is however difficult to implement Z3 (and possibly Z4) just by a single inductor without disturbing the low and high bitrate signals passing by.

The aforementioned considerations for Z1 and Z2 for their practical implementation with possible implementations given with respect to FIG. 3 hold equally well for impedances Z3 and Z4. Also, the statement that the Ferrite bead side or the small inductor side of Z1 (and Z2) should connect to the transmission lines 122 and 121 also holds for impedances Z3 and Z4: the Ferrite bead side or the small inductor side of Z3 (and Z4) should connect to the transmission lines 321 (and 322). Also the given examples of the ferrite beads, the inductors, type and part numbers are applicable. The third impedance (Z3) can hereby include also at least two components in series, whereby the first component is connected to the first transmission line (321) allowing the high bitrate signal to pass such that HIGH-LOW-HIGH-LOW bit sequences are not attenuated more than 30%, and the second component allows the low bitrate signal to pass such that the signal restore circuit (317) is still able to recover the low bitrate data signal without errors.

The foregoing description details certain embodiments of the invention. It will be appreciated, however, that no matter how detailed the foregoing appears in text, the invention may be practiced in many ways. It should be noted that the use of particular terminology when describing certain features or aspects of the invention should not be taken to imply that the terminology is being re-defined herein to be restricted to include any specific characteristics of the features or aspects of the invention with which that terminology is associated.

The invention claimed is:

1. A communication system comprising:
   at least one transceiver circuit; and
   a single-ended transmission medium including an inner conductor and a conductive shield layer,
   the inner conductor being coupled to the transceiver circuit by means of a first transmission line, and the conductive shield layer of the transmission medium being coupled to the transceiver circuit by means of a second transmission line,
   wherein a first impedance is coupled to the first transmission line for device power communication, the first impedance comprising at least one ferrite bead, the communication system being adapted for allowing DC current for the device power communication, and
   the first transmission line comprises an AC coupling capacitor, wherein the first impedance is connected with a first lead to the first transmission line between the AC coupling capacitor and the connection to the inner conductor of the single-ended transmission medium and is connected with a second lead directly to a power supply.

2. The communication system according to claim 1, first impedance being coupled between a power supply node and the first transmission line, the communication system further comprising a decoupling capacitor coupled between the power supply node and ground.

3. The communication system according to claim 1, wherein the first impedance comprises the at least one ferrite bead coupled in series with an inductor.

4. The communication system according to claim 1, wherein a second impedance is coupled to the second transmission line.

5. The communication system according to claim 4, wherein the second impedance comprises at least one ferrite bead.

6. The communication system according to claim 5, wherein the second impedance has the same constitution and value as the first impedance.

7. The communication system according to claim 4, the second transmission line comprising an AC coupling capacitor and a termination resistor, wherein the second impedance is connected with a first lead to the second transmission line between the AC coupling capacitor and the termination resistor.

8. The communication system according to claim 7, wherein the second impedance is connected with a second lead to a node, and wherein the termination resistor is terminated to said node.

9. The communication system according to claim 8, wherein the second impedance is connected with the second lead to ground.

10. The communication system according to claim 1, wherein the single-ended transmission medium is adapted for utilizing a common path for both transmission and reception.

11. The communication system according to claim 1, wherein the second transmission line includes an AC coupling capacitor and a termination resistor, wherein a second impedance is connected with a first lead to the second transmission line between the AC coupling capacitor and the termination resistor and is connected with a second lead to ground.

12. A communication system comprising:
at least one transceiver circuit; and
a single-ended transmission medium including an inner conductor and a conductive shield layer,
the inner conductor being coupled to the transceiver circuit by means of a first transmission line, and the conductive shield layer of the transmission medium being coupled to the transceiver circuit by means of a second transmission line,
wherein a first impedance is coupled to the first transmission line for device power communication, the communication system being adapted for allowing DC current for the device power communication, and
wherein the first impedance comprises four ferrite beads connected as twice a series of two ferrite beads, these series connections being coupled in parallel, and this parallel coupling being connected in series to an inductance.

13. A communication system comprising:
at least one transceiver circuit; and
a single-ended transmission medium including an inner conductor and a conductive shield layer,
the inner conductor being coupled to the transceiver circuit by means of a first transmission line, and the conductive shield layer of the transmission medium being coupled to the transceiver circuit by means of a second transmission line,
wherein a first impedance is coupled to the first transmission line for device power communication, the first impedance comprising at least one ferrite bead, the communication system being adapted for allowing DC current for the device power communication,
the first transmission line comprises an AC coupling capacitor, wherein the first impedance is connected to the first transmission line between the AC coupling capacitor and the connection to the inner conductor of the single-ended transmission medium, and
wherein the second transmission line includes an AC coupling capacitor and a termination resistor, wherein a second impedance is connected with a first lead to the second transmission line between the AC coupling capacitor and the termination resistor and is connected with a second lead to ground.

14. The communication system according to claim 13, the first impedance being coupled between a power supply node and the first transmission line, the communication system further comprising a decoupling capacitor coupled between the power supply node and ground.

15. The communication system according to claim 13, wherein the first impedance comprises the at least one ferrite bead coupled in series with an inductor.

16. The communication system according to claim 13, wherein the second impedance comprises at least one ferrite bead.

17. The communication system according to claim 16, wherein the second impedance has the same constitution and value as the first impedance.

18. The communication system according to claim 13, wherein the second impedance is connected with a second lead to a node, and wherein the termination resistor is terminated to said node.

19. The communication system according to claim 13, wherein the single ended transmission medium is adapted for utilizing a common path for both transmission and reception.

* * * * *